Patented Dec. 28, 1948

2,457,611

UNITED STATES PATENT OFFICE 2,457,611

PROCESS FOR THE PREPARATION OF MONOETHENOIC ACIDS AND THEIR ESTERS

Daniel Swern and Waldo C. Ault, Philadelphia, Pa., assignors to the United States of America as represented by the Secretary of Agriculture No Drawing. Application January 20, 1945, Serial No. 573,798

17 Claims. (Cl. 260—409)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a process for the preparation of purified monoethenoic acids and their esters and more particularly to a process for preparing oleic acid and its esters from fats and oils of animal and vegetable origin, such fats and oils having a relatively high ratio of oleic acid, in combination as gylcerides, to linoleic, or other polyunsaturated acids, also in combination as glycerides.

The invention has among its objects the provision of an economical process for the preparation of oleic acid and its esters having relatively high purity, and which are substantially free from the more unsaturated acids.

Oleic acid of high purity is not commercially available. Commercial samples rarely contain more than 75% of oleic acid and frequently contain only about from 60% to 70%. The chief impurities are usually about from 10% to 20% linoleic acid and about from 10% to 20% saturated acids. The commercial products are frequently dark in color, usually have undesirable odors and show poor color stability. A high degree of purity is not essential for some commercial uses but for many applications in organic synthesis and for use in pharmaceutical preparations and cosmetics, the commercially available grades of oleic acid are not suitable.

Laboratory procedures for the preparation of purified oleic acid from olive oil and commercial oleic acid are known. However, in order to prepare oleic acid of high purity by these methods and from these starting materials, it is necessary to separate the oleic acid from both the saturated and the polyunsaturated acids contained therein. The separation of oleic acid from linoleic acid is particularly difficult and requires low-temperature crystallization of the oleic acid from a suitable solvent at about from —40° C. to —60° C. and frequently two such crystallizations must be used successively.

Although this step effects a fairly complete removal of the linoleic acid, the solubilizing action of linoleic acid on oleic acid causes a considerable loss of oleic acid in the resulting filtrate with the more soluble linoleic acid. Moreover, such crystallizations require highly specialized equipment for cooling and filtering large quantities of material at low temperatures. Our process for the preparation of purified oleic acid, however, does not require such low crystallization temperatures when the fractional crystallization procedure is employed, and when the graining out and filtering or pressing procedure is used, low temperatures are not required at all nor is solvent crystallization necessary. Furthermore, it does not require specialized equipment of the type not now available to the fat industry.

Oleic acid prepared by our process is of value as an intermediate for organic synthesis and its color and odor stability make it useful where such properties are desirable as, for example, in the preparation of pharmaceutical and cosmetic formulations. Furthermore, the saturated acids which are separated by our process also have unusual color and odor stability and are suited for many uses, such as rubber compounding and in the preparation of cosmetics and lubricants.

In general, our process comprises the selective hydrogenation of the polyunsaturated components, particularly linoleic acid, which are in combination as glycerides in the fat or oil, while the oleic acid, also in combination as glycerides, remains substantially unaffected. This selective hydrogenation is then followed by hydrolysis and fractional crystallization of the fatty acids obtained from the selectively hydrogenated fat or oil, from a suitable solvent at or above —30° C. to precipitate solid acids, and, if desirable, subsequent fractional distillation of the filtrate which contains oleic acid. Or, after selectively hydrogenating the fat or oil and hydrolyzing it, graining out the saturated acids and then pressing or filtering to separate the liquid acids from the solid acids, and again, if desirable, subsequently distilling the filtrate containing the oleic acid.

While it is usually preferred to hydrogenate the fat or oil in its glyceride form before hydrolysis, selective hydrogenation of the fatty acids or their esters, other than glycerol esters, derived from a satisfactory fat or oil, with subsequent fractional crystallization at or above about —30° C., is accomplishable by the invention. Or, after selective hydrogenation of the fatty acid or ester and subsequent hydrolysis, the graining out of the saturated acids, followed by pressing or filtering to separate the liquid acids from the solid acids, is also accomplishable by the invention.

Since a selective method for hydrogenation is used, and since our preferred procedure reduces substantially all of the polyunsaturated components to either monoethenoic or saturated substances, without significantly affecting the monoethenoic constituents, such as oleic acid, the degree of hydrogenation required is approximately proportional to the percentage of polyunsaturated components in the fat or oil. Any method may be used for the hydrogenation which will give the desired selectivity, although it is preferred to operate at a temperature of about from 150° C. to 170° C. and using hydrogen at a pressure of about from 0.1 pound to 50 pounds per square inch in the presence of nickel catalysts.

As is well known, linoleic acid upon selective hydrogenation yields iso-oleic acid as well as oleic acid. Therefore, it is desirable to select as the starting materials fats and oils which contain low percentages of polyunsaturated components, such as linoleic acid, since less hydrogenation is required to reduce the polyunsaturated components substantially completely, or to the extent desired, and less iso-oleic is thus formed. Certain fats and oils, as compared with the majority of common fats or oils, are suited for the application of our process, since upon hydrolysis they yield fatty acids containing an appreciable proportion of oleic acid, relatively small proportions of linoleic acid, and only minor quantities of more highly unsaturated acids. Thus, when such materials are employed, only a small degree of hydrogenation is required, iso-oleic acid formation is minimized, and it is relatively simple to reduce the content of polyunsaturated components below one percent.

In the following Table I there is set forth the approximate average composition of the fatty acids of certain vegetable and animal fats and oils which are well adapted for use as starting materials in the application of the invention. This table also indicates the calculated ratio of oleic acid to polyunsaturated acids in these fats and oils. Although our process is applicable to raw materials in which the ratio of oleic to polyunsaturated acids is as low as three to one, it is preferred to use raw materials in which this ratio is higher.

TABLE I

*Approximate average composition of fatty acids of certain vegetable and animal fats and oils*

|  | Percent Saturated Acids | Percent Oleic Acid | Percent Polyunsaturated Acids | Approximate Ratio of Oleic to Polyunsaturated Acids |
|---|---|---|---|---|
| Lard | 38.0 | 55.0 | 7.0 | 7.8 |
| Tallow | 52.0 | 45.0 | 3.0 | 15.0 |
| California Olive Oil | 10 | 85.0 | 5.0 | 17.0 |
| Tea seed Oil | 10 | 83.0 | 7.0 | 11.8 |
| Cocoa Butter | 58 | 40.0 | 2.0 | 20.0 |
| Avocado Oil | 9 | 80.0 | 11.0 | 7.3 |

In Table II following, precise analytical data obtained on four different samples of fats and oils suitable for use in the above described process are shown.

TABLE II

*Properties and composition of some typical fats suitable for the preparation of purified oleic acid and esters thereof*

| Fat | Iodine No. | Percent Theoretical Triolein | Titer, °C. | Spectrophotometric analysis | | | | | Percent Total Polyunsaturated Acids |
|---|---|---|---|---|---|---|---|---|---|
|  |  |  |  | Percent Linoleic | Percent Linolenic | Percent Arachidonic | Conjugated | | |
|  |  |  |  |  |  |  | Percent Diene | Percent Triene |  |
| #1 | 50.0 | 45 | 42.8 | 4.8 | 0.02 | 0.37 | 0.91 | 0.02 | 6.1 |
| #2 | 60.4 | 50 | 40.8 | 8.5 | 0.41 | 0.14 | 0.36 | 0.00 | 9.4 |
| #3 | 50.2 | 48 | (¹) | 3.4 | 0.29 | 0.13 | 0.94 | 0.01 | 4.8 |
| #4 | 57.3 | 51 | (¹) | 6.2 | 0.24 | 0.11 | 0.92 | 0.01 | 7.5 |

¹ Not determined.

In Table III, which follows, the composition of these fats and oils after selective hydrogenation to reduce the polyunsaturated components is shown. It is quite obvious that for all practical purposes the fats and oils shown in Table III may be considered free from polyunsaturated components.

TABLE III

*Properties and composition of the fats shown in Table II after selective hydrogenation to reduce polyunsaturated components*

| Fat | Iodine No. | Percent Theoretical Triolein | Titer, °C. | Spectrophotometric analysis | | | | | Percent Total Polyunsaturated Acids |
|---|---|---|---|---|---|---|---|---|---|
|  |  |  |  | Percent Linoleic | Percent Linolenic | Percent Arachidonic | Conjugated | | |
|  |  |  |  |  |  |  | Percent Diene | Percent Triene |  |
| #1H | 40.0 | 46 | (¹) | 0.16 | 0.00 | 0.00 | 0.10 | 0.00 | 0.26 |
| #2H | 47.8 | 55 | (¹) | 0.29 | 0.00 | 0.00 | 0.18 | 0.00 | 0.47 |
| #3H | 40.5 | 46 | 44.7 | 0.26 | 0.00 | 0.00 | 0.12 | 0.00 | 0.38 |
| #4H | 37.0 | 43 | 47.0 | 0.19 | 0.02 | 0.00 | 0.10 | 0.00 | 0.31 |

¹ Not determined.

After selective hydrogenation, the fatty acids may be obtained from the fats by any convenient and known procedures, such as the Twitchell process, alkaline saponification or hydrolysis under pressure.

The fatty acids, which are in mixture form, are then ready to be subjected to further treatment in accordance with the invention. This further treatment comprises either the fractional crystallization procedure or the graining out and pressing or filtering process. The former will be considered first.

The fractional crystallization method comprises dissolving the fatty acids in a suitable solvent from which they are fractionally crystallized. The saturated acids, particularly stearic acid, are removed by this treatment. By employing temperatures near the lower limit (−30° C.), the iso-oleic acids may also be removed with the saturated acids. The conditions for conducting the crystallization step may be varied quite widely to obtain different desired properties in the products. For example, the crystallization may be conducted at temperatures ranging about from −30° C. up to about +20° C. For solvents, petroleum fractions, such as commercial hexane or heptane, ketones, such as acetone or dimethyl ketone, chlorinated solvents, such as chloroform or ethylene dichloride, or aromatic hydrocarbons, such as toluene or xylene are suitable. Very frequently, it is desirable to use mixtures of two or more of the above solvents. To be applicable to the invention, the solvent should not react with the fatty acids under the conditions employed, but alcohols, such as methyl, ethyl, or isopropyl alcohol can be used. Moreover, the solvent should not solidify or develop undesirable viscosity at the temperatures used and it should be readily recoverable. It should be a good solvent for the fatty acids but not so powerful as to prevent the crystallization of the saturated acids at the temperatures used. Acetone has been found to be a very suitable solvent.

The crystallization of the saturated or solid fatty acids may be conducted stepwise, that is, the relatively insoluble saturated or solid acids may be crystallized at a relatively high temperature, for example, in the range of about from 0° C. to +20° C., and then filtered. The filtrate may then be cooled further, for example, to some temperature in the range of about from 0° C. to −30° C., and the material which crystallizes obtained as a separate fraction. This fractional crystallization of the saturated or solid acids into various fractions may be continued until full separation has been effected.

The graining out and pressing or filtering procedure will now be described. This treatment of the fatty acids comprises graining out or crystallizing the saturated acids from the fatty acid mixture and separating the liquid portion from the more saturated solidified fatty acids by pressing or filtration. The procedure will vary somewhat with the nature of the raw material being used on the one hand and with the qualities desired in the finished product on the other hand. For example, if a fat or oil having a relatively high proportion of saturated acids be used as the starting material, it may be desirable to perform the graining operation in pans, remove the semi-solid cake from the pans when graining is complete, place the cake in suitable bags, and remove the oleic fraction by pressing. On the other hand, if a fat or oil having only a relatively small proportion of saturated acids be used as the starting material, as would be the case from selectively hydrogenated olive oil or teaseed oil, it may be desirable to chill the fatty acid in a large vessel, allow the solid saturated portion to settle and purify the liquid oleic fraction by filtration to remove the solid saturated acids.

After the saturated acids have been removed by the crystallization procedure and the solvent evaporated, or after the graining and pressing or filtering operation, the remaining product will be oleic acid having a purity of about from 75% to 90%. It may be used as such for various purposes or converted to a desired ester by known and suitable means. Thus, for example, it may be converted to methyl oleate by refluxing with an excess of methyl alcohol for a short time in the presence of catalysts, such as sulfuric acid. Other alcohols, such as ethyl, propyl, and isopropyl alcohol, and ethylene glycol and glycerol may be used to esterify the oleic acid.

In general, therefore, the invention includes any operation involving the selective hydrogenation of a fat or oil or products derived therefrom by hydrolysis or ester-interchange, followed by a purification which involves a graining out and pressing or filtering separation of the solid acids from oleic acid, or a purification which involves a crystallization of the selectively hydrogenated material or products derived therefrom by hydrolysis or ester-interchange, to yield oleic acid or an ester thereof. The invention applies also to the crystallization of the esters of the fatty acids although it is preferred to crystallize the fatty acids themselves.

The following examples are illustrative of the invention.

EXAMPLE I

Fats No. 1 and No. 2 of Table II were selectively hydrogenated to yield fats No. 1H and No. 2H of Table III. Eight hundred and fifty grams of fatty acids having an iodine number of 45.6 and an approximate composition of 50.3% oleic acid, 0.4% polyunsaturated acids and 49.3% saturated acids, obtained by the saponification of equal parts of fats No. 1H and No. 2H, followed by acidification, were dissolved in 5100 ml. of acetone and the solution was cooled to about 0° C. After standing over night at this temperature, the formed precipitate, weighing 335 g. and having an iodine number of less than 10, which contained substantially all the stearic acid and some of the palmitic acid present in the fatty acids being crystallized, was separated by filtration. The solvent was recovered from the filtrate and the liquid acids, which were obtained as a residue weighing 505 g. having an iodine number of 72.9 and an approximate composition of 80% oleic acid, less than 1% polyunsaturated acids, and 19% saturated acids, were fractionally distilled under reduced pressure. The fraction distilling over at about 210° C. to 212° C. at 4 mm. of mercury absolute pressure was a colorless, odorless oil which weighed 270 g. and comprised almost exclusively oleic acid having an iodine number of 88.3 and an approximate composition of 97% oleic acid, 0.4% polyunsaturated acids and 2.6% saturated acids. Its titer was about 28° C.

EXAMPLE II

A purified oleic acid was prepared exactly as described in Example I. In order to obtain a material having a lower titer, this product was dissolved in acetone (2 ml./gram of oleic acid) and the solution was cooled to about 0° C. A precipitate formed which was removed by filtration and found to comprise mainly iso-oleic and saturated acids. The colorless oil obtained from the filtrate after recovery of the solvent had a titer below 20° C., an iodine number of 90.6, and an approximate composition of 99% oleic acid, 0.4% polyunsaturated acids and 0.6% saturated acids.

EXAMPLE III

Fats No. 3 and No. 4 of Table II were selectively hydrogenated to yield fats No. 3H and No. 4H of Table III. Fifteen hundred and forty grams of fatty acids having an iodine number of 39.6 and an approximate composition of 43.7% oleic acid, 0.4% polyunsaturated acids and 55.9% saturated acids, obtained by the saponification of approximately equal parts of fats No. 3H and No. 4H, followed by acidification, were dissolved in 9240 ml. of acetone and the solution was cooled to about −20° C. The formed precipitate weighing 913 g. and having an iodine number of 12.6, which contained substantially all the stearic and a major proportion of the palmitic and iso-oleic acids present in the fatty acids being treated, was separated by filtration. The solvent was recovered from the filtrate yielding oleic acid as a residue which weighed 579 g., had an iodine number of 81.3 and an approximate composition of 90% oleic acid, less than 1% polyunsaturated acids, and 9.5% saturated acids. This product was straight-run distilled to produce a substantially colorless product with remarkable color stability.

EXAMPLE IV

A purified oleic acid was prepared exactly as described in Example III. Five hundred and seventy grams of this material was fractionally distilled to obtain high purity oleic acid. The fraction boiling at about 207° C.–208° C. at about 3 to 4 mm. of mercury absolute pressure weighed 318 g. It was a substantially colorless and odorless oil which comprised almost exclusively oleic acid having an iodine number of 91.3 and an approximate composition of 98.5% oleic acid, less than 1% polyunsaturated acids and less than 1% saturated acids.

EXAMPLE V

Fat No. 2 was hydrogenated under conditions favoring selectivity but approximately 1% of the polyunsaturated components were unaffected. The fatty acids obtained from such a hydrogenated material by hydrolysis after being processed as described in Example I, yielded a purified oleic acid with a titer of about 24° C., an iodine number of 89.0, and an approximate composition of 94% oleic acid, 1% to 3% polyunsaturated acids, and 3% to 5% saturated acids.

EXAMPLE VI

The purified oleic acid obtained as described in Example V was further processed as described in Example II, in order to produce a product with a lower titer. The oleic acid thus obtained had a titer of about 14° C., an iodine number of 91.6, and an approximate composition of 96% to 98% oleic acid, 1% to 3% polyunsaturated acids, and 1% saturated acids.

EXAMPLE VII

The fatty acids obtained from the hydrogenated fat described in Example V were processed as described in Example IV. The fraction boiling at about 205° to 208° C. at 4 mm. of mercury absolute pressure, comprised oleic acid with a titer below 10° C., an iodine number of 94, and an approximate composition of 98% oleic acid, 1% to 2% polyunsaturated acids, and 0% to 1% saturated acids.

EXAMPLE VIII

Eight hundred and twenty grams of animal fat were selectively hydrogenated to reduce polyunsaturated components to below 0.5%. The selective hydrogenation was accomplished by stirring the fat in an autoclave in the presence of 0.5% nickel catalyst while heating to about 165° C. to 170° C. Hydrogen was introduced and used in pressures up to about 10 lbs. per sq. inch. Hydrogenation was continued until examination of samples which were periodically withdrawn showed that the polyunsaturated components were substantially eliminated. The fat was then filtered to remove the catalyst and was subjected to ester-interchange by refluxing for about 45 minutes with 1640 ml. of methyl alcohol in which 3 g. of metallic sodium had been dissolved. The solution was then diluted with a large excess of water containing 25 ml. of 6 N hydrochloric acid and the formed methyl esters were washed several times with water. These esters weighed about 800 g., had an iodine number of 28.2, and an approximate composition of 32.2% methyl oleate, 0.3% polyunsaturated esters, and 67.5% saturated esters. Seven hundred and ninety grams of these methyl esters were then dissolved in 6000 ml. of acetone and the solution cooled to about −30° C. with stirring. The precipitate which formed, weighing 539 g. and having an iodine number of 8.3, was separated by filtration. Recovery of the solvent from the filtrate by distillation yielded methyl oleate of moderately high purity as a residue, having an iodine number of 70.0, and an approximate composition of 81.3% methyl oleate, 0.3% polyunsaturated esters, and 18.4% saturated esters. Straight-run distillation yielded 244 g. of odorless and colorless methyl oleate having extraordinary odor and color stability. Its titer was below 0° C.

EXAMPLE IX

Methyl oleate was prepared as described in Example VIII but it was fractionally distilled instead of straight-run distilled. The fraction boiling at about 180° C. to 182° C. at about 4.4 mm. of mercury absolute pressure was a colorless, odorless oil which comprised almost exclusively methyl oleate having an iodine number of 84 and an approximate composition of 97.8% methyl oleate, 0.3% polyunsaturated esters, and 1.9% saturated esters.

EXAMPLE X

Fat No. 2 (tallow) of Table II, having an iodine number of about 60.4, was hydrogenated under conditions favorable to the selective hydrogenation of the polyunsaturated components. This hydrogenation was accomplished by stirring 1 lb. of the fat in an autoclave in the presenec of 2 g. of nickel catalyst and under a hydrogen pressure of about 5 lbs. to 15 lbs. per sq. inch. The charge was heated to about 165° C. during the hydrogenation and the hydrogenation was then continued until a small sample of the fat withdrawn had an iodine number of 43. The hydrogenation was then stopped, the fat was cooled to about 75° C. and withdrawn from the autoclave, the catalyst being removed by filtration of the warm fat.

Fatty acids were prepared from the partially hydrogenated fat by saponification and subsequent acidification, and the fatty acids so obtained had an iodine number of 46.2 and an approximate composition of oleic acid 50%, polyunsaturated acids 0.5%, and saturated acids 49.1%.

Three hundred grams of the fatty acids prepared in the above described manner were cooled to about 25° C. and held at that temperature for about one hour. The resulting cake was wrapped in filter cloth and pressed for 15 minutes in a hydraulic press while maintaining the temperature at about 25° C. The press cake was hard and white except for a narrow portion around the edge of the cake which was soft. This soft part was trimmed off, placed in the center of the cake and the pressing repeated. The cake remaining behind weighed 150 g. and had a titer of about 52° C., indicating it was chiefly saturated acids.

The oil which was pressed from the cake weighed 130 g. and upon examination was found to contain approximately 81% oleic acid, 18% saturated fatty acids and 1% polyunsaturated acids. It was amber in color.

EXAMPLE XI

Oleic acid was prepared exactly as described in Example X but by simple distillation at an absolute mercury pressure of 4 mm. a light colored product was obtained practically quantitatively.

EXAMPLE XII

Five hundred grams of oleic acid containing approximately 81% oleic acid were prepared by the procedure described in Example X and then fractionally distilled. The first fraction, which distilled at a temperature about from 147° C. to 209° C. at about 4 mm. of mercury absolute pressure, weighed 180 g. and comprised chiefly palmitic acid and other acids of chain length less than 18 carbon atoms. The main fraction weighing 267 g., which distilled at about 210° C. to 212° C. at about 4 mm. of mercury absolute pressure, was found by chemical analysis to contain over 95% oleic acid and less than 1% of polyunsaturated acids. It was a practically water-white liquid having no odor. When heated in an oven at about 100° C. for about 48 hours, no significant color development occurred indicating extraordinary color stability.

EXAMPLE XIII

Five hundred grams of oleic acid were prepared as described in Example X. This was then refluxed for several hours with a large excess of methyl alcohol to which 5 cc. of concentrated (96%) sulfuric acid had been added. At the end of this time most of the methanol was recovered by distillation and the resulting methyl oleate was transferred to a separatory funnel and washed 3 times with liter portions of water to remove the sulfuric acid and unrecovered methanol. The resulting esters were dried and fractionally distilled. The first fraction, which distilled at a temperature of about 79° C. to 180° C. at 4 mm. of mercury absolute pressure, contained appreciable portions of methyl palmitate and other esters of chain length less than 18 carbon atoms. The main fraction, which distilled at about from 180° C. to 182° C. at about 4 mm. of mercury absolute pressure, contained over 95% methyl oleate and only a trace of polyunsaturated esters were present as determined by spectrophotometric examination. The methyl oleate prepared in this manner was water-white and had no odor. When heated in an oven at about 100° C. for about 48 hours, no significant color development occurred indicating extraordinary color stability.

Having thus described our invention, what is claimed is:

1. A process for the preparation of purified oleic acid from a material selected from the class consisting of fats and oils, the fatty acids of which contain saturated acids, oleic acid, and polyunsaturated acids, the latter two in the ratio of at least three to one, respectively, comprising selectively hydrogenating said material to reduce substantially all of said polyunsaturated acids to either saturated or monoethenoic acids without significantly affecting the oleic acid, followed by hydrolyzing the hydrogenated material to form a mixture consisting essentially of saturated and monoethenoic fatty acids, and then separating the saturated acids from the monoethenoic acids by causing the crystallization of the saturated acids as a solid phase from said fatty acid mixture and recovering the monoethenoic acids, which consist essentially of oleic acid, as the liquid phase thereof.

2. A process for the preparation of purified oleic acid from a material selected from the class consisting of fats and oils, the fatty acids of which contain saturated acids, oleic acid, and polyunsaturated acids, the latter two in the ratio of at least three to one, respectively, comprising selectively hydrogenating said material to reduce substantially all of said polyunsaturated acids to either saturated or monoethenoic acids without significantly affecting the oleic acid, followed by hydrolyzing the hydrogenated material to form a mixture consisting essentially of saturated and monoethenoic fatty acids, graining out the saturated acids from the mixture of fatty acids so obtained, thereby to form a two-phase system wherein the saturated acids constitute the solid phase and the monoethenoic acids form the liquid phase, and then pressing said system to separate the saturated acids from the monoethenoic acids which consist essentially of oleic acid.

3. A process for the preparation of purified oleic acid from a material selected from the class consisting of fats and oils, the fatty acids of which contain saturated acids, oleic acid, and polyunsaturated acids, the latter two in the ratio of at least three to one, respectively, comprising selectively hydrogenating said material to reduce substantially all of said polyunsaturated acids to either saturated or monoethenoic acids without significantly affecting the oleic acid, followed by hydrolyzing the hydrogenated material to form a mixture consisting essentially of saturated and monoethenoic fatty acids, graining out the saturated acids from the mixture of fatty acids so obtained, thereby to form a two-phase system wherein the saturated acids constitute the solid phase and the monoethenoic acids form the liquid phase, and then filtering said system to separate the saturated acids from the monoethenoic acids which consist essentially of oleic acid.

4. A process for the preparation of purified oleic acid from a material selected from the class consisting of fats and oils, the fatty acids of which contain saturated acids, oleic acid, and polyunsaturated acids, the latter two in the ratio of at least three to one, respectively, comprising selectively hydrogenating said material to reduce substantially all of said polyunsaturated acids to either saturated or monoethenoic acids without significantly affecting the oleic acid, followed by hydrolyzing the hydrogenated material to form a mixture consisting essentially of saturated and monoethenoic fatty acids, and then fractionally crystallizing the mixture of fatty acids so obtained, from a suitable solvent to separate the saturated acids as a solid phase from the monoethenoic acids, which consist essentially of oleic acid, in liquid phase.

5. A process for the preparation of purified oleic acid from a material selected from the class consisting of fats and oils, the fatty acids of which contain saturated acids, oleic acid, and polyunsaturated acids, the latter two in the ratio of at least three to one, respectively, comprising selectively hydrogenating said material to reduce substantially all of said polyunsaturated acids to either saturated or monoethenoic acids without significantly affecting the oleic acid, followed by hydrolyzing the hydrogenated material to form a mixture consisting essentially of saturated and monoethenoic fatty acids, and then fractionally crystallizing the mixture of fatty acids so obtained, from a suitable solvent at a temperature of about from −30° C. to +20° C. to separate the saturated acids and the iso-oleic acids as a solid phase from the monoethenoic acids, which consist essentially of oleic acid, in liquid phase.

6. A process for the preparation of purified oleic acid from a material selected from the class consisting of fats and oils, the fatty acids of which contain saturated acids, oleic acid, and polyunsaturated acids, the latter two in the ratio of at least three to one, respectively, comprising selectively hydrogenating said material to reduce substantially all of said polyunsaturated acids to either saturated or monoethenoic acids without significantly affecting the oleic acid, followed by hydrolyzing the hydrogenated material to form a mixture consisting essentially of saturated and monoethenoic fatty acids, separating the saturated acids from the monoethenoic acids by causing the crystallization of the saturated acids as a solid phase from said fatty acid mixture and recovering the monoethenoic acids, which consist essentially of oleic acid, as the liquid phase thereof, and then distilling the monoethenoic acids to separate the oleic acid from the other monoethenoic fatty acids of longer and shorter chain length.

7. A process for the preparation of purified oleic acid from a material selected from the class consisting of fats and oils, the fatty acids of which contain saturated acids, oleic acid, and polyunsaturated acids, the latter two in the ratio of at least three to one, respectively, comprising selectively hydrogenating said material to reduce substantially all of said polyunsaturated acids to either saturated or monoethenoic acids without significantly affecting the oleic acid, followed by hydrolyzing the hydrogenated material to form a mixture consisting essentially of saturated and monoethenoic fatty acids, graining out the saturated acids from the mixture of fatty acids so obtained, thereby to form a two-phase system wherein the saturated acids constitute the solid phase and the monoethenoic acids form the liquid phase, pressing said system to separate the saturated acids from the monoethenoic acids which consist essentially of oleic acid, and then distilling the monoethenoic acids to separate the oleic acid from the other monoethenoic fatty acids of longer and shorter chain length.

8. A process for the preparation of purified oleic acid from a material selected from the class consisting of fats and oils, the fatty acids of which contain saturated acids, oleic acid, and polyunsaturated acids, the latter two in the ratio of at least three to one, respectively, comprising selectively hydrogenating said material to reduce substantially all of said polyunsaturated acids to either saturated or monoethenoic acids without significantly affecting the oleic acid, followed by hydrolyzing the hydrogenated material to form a mixture consisting essentially of saturated and monoethenoic fatty acids, graining out the saturated acids from the mixture of fatty acids so obtained, thereby to form a two-phase system wherein the saturated acids constitute the solid phase and the monoethenoic acids form the liquid phase, filtering said system to separate the saturated acids from the monoethenoic acids which consist essentially of oleic acid, and then distilling the monoethenoic acids to separate the oleic acid from the other monoethenoic fatty acids of longer and shorter chain length.

9. A process for the preparation of purified oleic acid from a material selected from the class consisting of fats and oils, the fatty acids of which contain saturated acids, oleic acid, and polyunsaturated acids, the latter two in the ratio of at least three to one, respectively, comprising selectively hydrogenating said material to reduce substantially all of said polyunsaturated acids to either saturated or monoethenoic acids without significantly affecting the oleic acid, followed by hydrolyzing the hydrogenated material to form a mixture consisting essentially of saturated and monoethenoic fatty acids, fractionally crystallizing the mixture of fatty acids so obtained, from a suitable solvent to separate the saturated acids as a solid phase from the monoethenoic acids, which consist essentially of oleic acid, in liquid phase, and then distilling the monoethenoic acids to separate the oleic acid from the other monoethenoic fatty acids of longer and shorter chain length.

10. A process for the preparation of purified oleic acid from a material selected from the class consisting of fats and oils, the fatty acids of which contain saturated acids, oleic acid, and polyunsaturated acids, the latter two in the ratio of at least three to one, respectively, comprising selectively hydrogenating said material to reduce substantially all of said polyunsaturated acids to either saturated or monoethenoic acids without significantly affecting the oleic acid, followed by hydrolyzing the hydrogenated material to form a mixture consisting essentially of saturated and monoethenoic fatty acids, fractionally crystallizing the mixture of fatty acids so obtained, from a suitable solvent to separate the saturated acids and the iso-oleic acids as a solid phase from the monoethenoic acids, which consist essentially of oleic acid, in liquid phase, and then distilling the monoethenoic acids to separate the oleic acid from the other monoethenoic fatty acids of longer and shorter chain length.

11. A process for the preparation of a purified ester of oleic acid from a material selected from the class consisting of fats and oils, the fatty acids of which contain saturated acids, oleic acid, and polyunsaturated acids, the latter two in the ratio of at least three to one, respectively, comprising selectively hydrogenating said material to reduce substantially all of said polyunsaturated acids to either saturated or monoethenoic acids without significantly affecting the oleic acid, followed by hydrolyzing the hydrogenated material to form a mixture consisting essentially of saturated and monoethenoic fatty acids, separating the saturated acids from the monoethenoic acids by causing the crystallization of the saturated acids as a solid phase from said fatty acid mixture and recovering the monoethenoic acids, which consist essentially of oleic acid, as the liquid phase thereof, and converting the monoethenoic acids to esters thereof by treating them with an alcohol under such conditions as to cause esterification to take place.

12. A process for the preparation of a purified ester of oleic acid from a material selected from the class consisting of fats and oils, the fatty acids of which contain saturated acids, oleic acid, and polyunsaturated acids, the latter two in the ratio of at least three to one, respectively, comprising selectively hydrogenating said material to reduce substantially all of said polyunsaturated acids to either saturated or monoethenoic acids without significantly affecting the oleic acid, followed by hydrolyzing the hydrogenated material to form a mixture consisting essentially of saturated and monoethenoic fatty acids, separating the saturated acids from the monoethenoic acids by causing the crystallization of the saturated acids as a solid phase from said fatty acid mixture and recovering the monoethenoic acids, which consist essentially of oleic acid, as the liquid phase thereof, converting the monoethenoic acids to esters thereof by treating them with an alcohol under such conditions as to cause esterification to take place, and then fractionally distilling the monoethenoic esters to separate the ester of oleic acid from the other monoethenoic esters of longer and shorter chain length.

13. A process for the preparation of a purified ester of oleic acid from a material selected from the class consisting of fats and oils, the fatty acids of which contain saturated acids, oleic acid, and polyunsaturated acids, the latter two in the ratio of at least three to one, respectively, comprising selectively hydrogenating said material to reduce substantially all of said polyunsaturated acids to either saturated or monoethenoic acids without significantly affecting the oleic acid, followed by ester-interchange to convert said saturated and monoethenoic fatty acids to the corresponding esters thereof, and then fractionally crystallizing the formed esters from a suitable solvent to separate the saturated esters as a solid phase from the monoethenoic esters, which consist essentially of oleic acid esters, in liquid phase.

14. A process for the preparation of a purified ester of oleic acid from a material selected from the class consisting of fats and oils, the fatty acids of which contain saturated acids, oleic acid, and polyunsaturated acids, the latter two in the ratio of at least three to one, respectively, comprising selectively hydrogenating said material to reduce substantially all of said polyunsaturated acids to either saturated or monoethenoic acids without significantly affecting the oleic acid, followed by ester-interchange to convert said saturated and monoethenoic fatty acids to the corresponding esters thereof, fractionally crystallizing the formed esters from a suitable solvent to separate the saturated esters as a solid phase from the monoethenoic esters, which consist essentially of oleic acid esters, in liquid phase, and then fractionally distilling the monoethenoic esters to separate the esters of oleic acid from the other monoethenoic esters of longer and shorter chain length.

15. A process of claim 1, wherein the material selected from the class consisting of fats and oils is tallow.

16. A process of claim 1, wherein the material selected from the class consisting of fats and oils is grease.

17. A process of claim 1, wherein the material selected from the class consisting of fats and oils is olive oil.

DANIEL SWERN.
WALDO C. AULT.

REFERENCES CITED

The following references are of record in the file of this patent:

UNITED STATES PATENTS

| Number | Name | Date |
|---|---|---|
| 406,158 | Bardy | July 2, 1889 |
| 2,163,603 | Jenness | June 27, 1939 |
| 2,293,676 | Myers | Aug. 18, 1942 |
| 2,293,729 | Gudheim | Aug. 25, 1942 |
| 2,298,501 | Myers et al. | Oct. 13, 1942 |
| 2,302,994 | Gwynn | Nov. 24, 1942 |
| 2,305,498 | Segessemann | Dec. 15, 1942 |
| 2,311,633 | Blaso | Feb. 23, 1943 |
| 2,350,768 | Kellogg | June 6, 1944 |